United States Patent [19]

Loomer

[11] 4,245,715

[45] Jan. 20, 1981

[54] AUTOMATIC DRIVE PREVENTION

[75] Inventor: Weston R. Loomer, Walton, Ky.

[73] Assignee: Litton Systems, Inc., Florence, Ky.

[21] Appl. No.: 63,671

[22] Filed: Aug. 6, 1979

[51] Int. Cl.³ ............................................. B60K 27/08
[52] U.S. Cl. ...................................... 180/279; 293/4; 414/273
[58] Field of Search ............... 180/274, 275, 276, 277, 180/278, 279, 273; 293/4, 5, 6, 2; 414/273, 275, 284

[56] References Cited

U.S. PATENT DOCUMENTS

| 1,174,709 | 3/1916 | Gilbert | 180/277 |
|---|---|---|---|
| 1,183,561 | 5/1916 | Hedley et al. | 180/275 |
| 1,391,952 | 9/1921 | Hagerty | 180/276 |
| 1,859,186 | 5/1932 | Urbach | 180/279 |
| 3,387,724 | 6/1968 | Armington | 414/275 |
| 3,973,685 | 8/1976 | Loomer | 414/273 |
| 4,091,889 | 5/1978 | Brown | 180/273 |
| 4,137,984 | 2/1979 | Jennings | 180/274 |

FOREIGN PATENT DOCUMENTS

| 592295 | 9/1947 | United Kingdom | 180/276 |
|---|---|---|---|
| 982148 | 2/1965 | United Kingdom | 414/275 |

*Primary Examiner*—David M. Mitchell
*Attorney, Agent, or Firm*—Herbert A. Stern

[57] ABSTRACT

An automatic drive prevention mechanism for an automated vehicle. The mechanism includes a switch frame having a rectangular periphery pivotally mounted on the automated vehicle and a switch mechanism, including a switch, coupled between the switch frame and the vehicle drive means, the switch being arranged to be activated to interrupt drive power to the vehicle when the frame is pivoted out of its neutral position. The switch mechanism includes a self-centering switch controller and the switch is arranged so that pivoting the switch frame causes actuation of the switch and release of the switch frame permits the self-centering controller to urge the switch mechanism to return to its original configuration thereby deactivating the switch and permitting the drive to be re-started.

8 Claims, 6 Drawing Figures

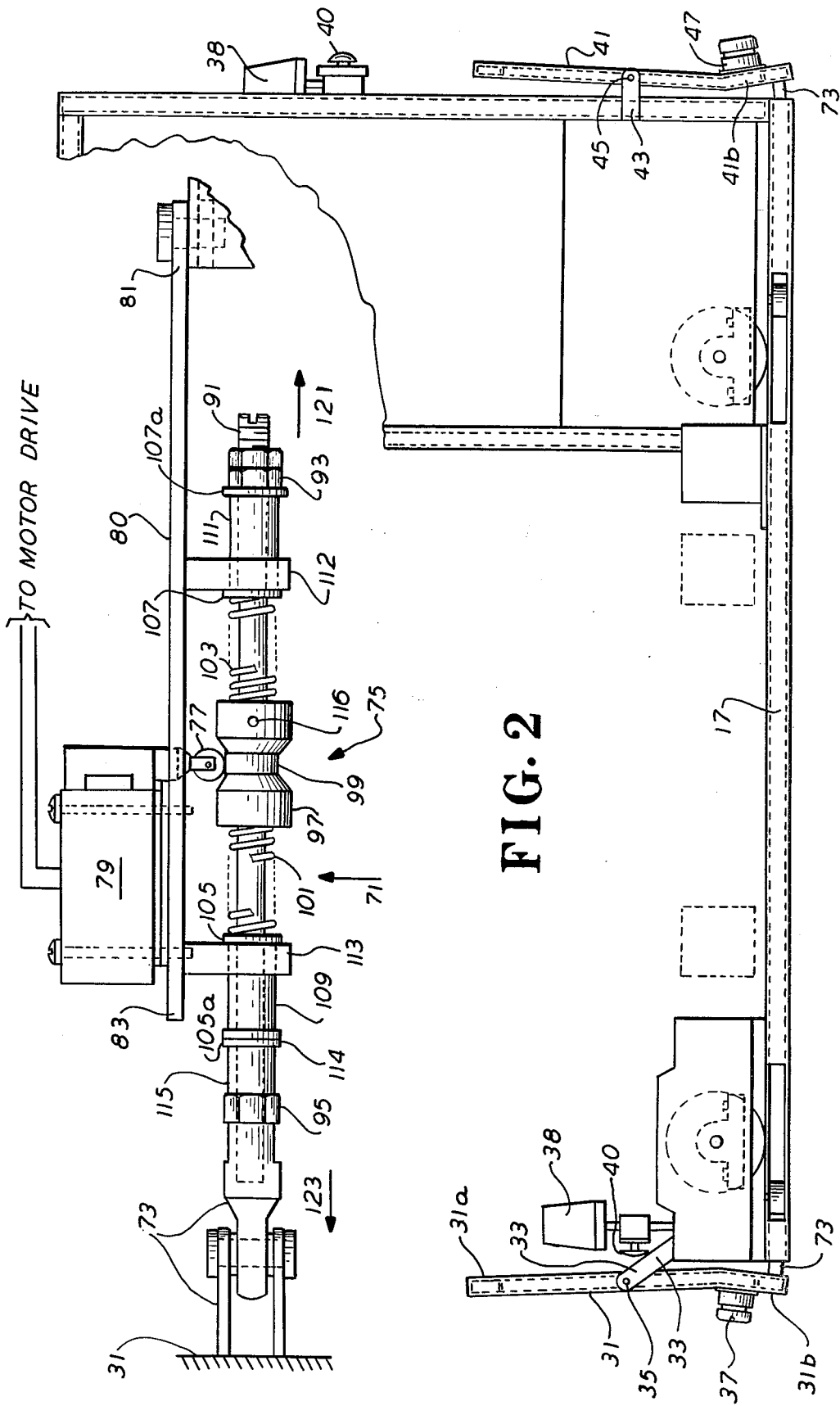

AUTOMATIC DRIVE PREVENTION

BACKGROUND OF THE INVENTION

This invention relates to an automated vehicle system and more particularly to such a system including a safety drive prevention mechanism.

Automated storage and retrieval systems of the type presently known in the art are generally rack structures which include a plurality of lanes and a number of aisles which extend orthogonally from each lane. Items being stored in the rack, such as loaded pallets, are positioned in the aisles. To retrieve a loaded pallet from a position within an aisle or to deposit a loaded pallet therein, it is necessary for a vehicle, commonly referred to as a robot or satellite vehicle, to enter the aisle. Because robots are expensive it is been found advantageous to have a single robot service a number of the aisles which extend from a lane rather than to provide a robot for each aisle. To carry the robot between the various aisles, a vehicle commonly referred to as a transfer vehicle, or a transfer car or crane, which moves along the lane, is provided.

As is well known in the art, such transfer cars ride on tracks in the lanes. Generally, the lane structures are not open but the area between the tracks of the lane is a surface which functions as a walk path. This walk path is provided for any one of a number of reasons including, for example, to permit the visual inspection of pallets in the aisles to be accomplished or so that repair work on the robot or the transfer vehicle may be performed.

Because, as is well known in the art, the robots which are carried by the vehicles must leave the vehicles and enter the aisles, and because alignment of the robots with the tracks of the aisles is a relatively difficult procedure, the width of the transfer vehicle is generally made such that the sides of the transfer vehicle are close to the entrances of the aisles, thereby minimizing the distance the robots must move off the transfer vehicle before entering the aisle and thus simplifying the alignment of the robot with the aisle. Similarly, transfer vehicles are conventionally constructed so that the clearance between the bottom of the transfer vehicle and the walk path surface of the lane is minimal. This is because rack structures, for purposes of space use efficiency, are generally built several levels high. Clearly, minimizing the overall height of each transfer vehicle and robot, so that their combined vertical height approaches that required by a loaded pallet, permits the provision of a maximum number of vertically extending storage spaces in a minimum height.

These efficiencies, however, also result in a warehouse system in which the transfer vehicle utilizes virtually all the area of a lane and a person in a lane cannot stand to one side or lie down between the tracks to avoid being struck by a transfer vehicle which is moving in a line. Clearly, persons could easily by seriously injured if they are struck by the transfer cars which frequently exceed speeds of 400 ft. per minute while traveling in a lane.

It is to avoid the aforementioned problems that a number of different safety systems have been developed. One such prior art system involves the provision of emergency stop buttons mounted in the fore and aft sections of the transfer vehicle. These button switches, however, do not provide a satisfactory solution to the problem for a number of reasons. For one thing, it is necessary for a person in a lane to reach over the leading edge of the transfer vehicle to depress the switch and, because the vehicle is frequently traveling at speeds exceeding 400 ft. per minute, the person attempting to reach the switch may easily be struck by the vehicle while the attempt is being made. Additionally, the switch which is frequently a depression actuated button, presents such a small target that a person in the lane frequently cannot reach the button from the side or, in haste, can easily miss it completely. Another improved system which has been provided includes a pivotable bar located near the bottom portion of the transfer vehicle. The bar stretches across the width of the transfer vehicle and is arranged to pivot inwardly toward the vehicle to actuate an off-switch upon striking an object and being urged inwardly. This improved bar safety mechanism serves a two-fold purpose. Firstly, it prevents damage to the transfer vehicle in the event that an obstruction such as, for example, a section of wooden pallet is on the walk path between the tracks. Further, a person on the walk path can, in the event that it is noted that a transfer vehicle is bearing down, kick at the transversly extending bar, thereby actuating the emergency stop mechanism. It has been found, however, that notwithstanding the fact that the bar actuated mechanism is an improvement over the depression button mechanism discussed above, even the low bar mechanism is not completely satisfactory. This is because the bar mechanism requires a person on the walk path to lash out with his foot, thereby placing himself off-balance, and he is more readily subject to being knocked down by the vehicle while off-balance. Additionally, it is difficult for a person in a lane to reach the bar (which, as noted above, is located across the width of the transfer vehicle in the lower portion thereof) if the person is at the side of a lane rather than in the center thereof, and it is virtually impossible to reach the shut-off bar if the person is in the upper area of the lane.

SUMMARY OF THE INVENTION

It is, therefore, an important object of the instant invention to provide an automatic drive prevention mechanism for an automated vehicle by means of which the aforesaid drawbacks and disadvantages may be most efficaciously avoided.

It is a further object of the invention to provide such a mechanism which can easily be actuated by a person anywhere in the vicinity of an automated vehicle.

It is a still further object of the invention to provide such a mechanism which will de-activate an automated vehicle in the event the vehicle strikes any obstruction in its path.

Generally speaking, the objectives of the instant invention are attained by the provision of an automated drive prevention mechanism for an automated vehicle comprising a vehicle including motive means arranged for travel along a path, a switch frame pivotally mounted on the vehicle, the frame lying generally in a plane orthogonal to the path when the frame is in its inactive position, and switch means coupled to the frame and arranged to be activated to interrupt motive power to the vehicle when the frame is pivoted out of the orthogonal plane.

The foregoing and other objects and features of the present invention will be more clearly understood from the following detailed description thereof, when read in conjunction with the accompanying drawings, in which:

BRIEF DESCRIPTION OF THE DRAWINGS

FIG. 2 is a side view of an automated transfer vehicle including the inventive automatic drive prevention mechanism;

FIG. 6 is a detailed view of the self-balancing portion of the mechanism illustrated in FIG. 5.

DESCRIPTION OF THE PREFERRED EMBODIMENT

Figure 1:
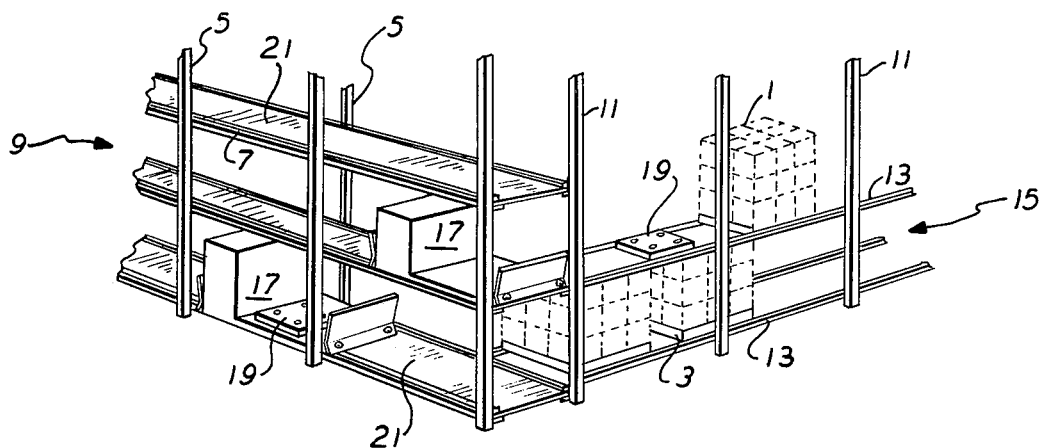
FIG. 1 is a perspective view of an automated warehousing system including the inventive automatic drive prevention mechanism.

Referring to the drawings, FIG. 1 illustrates a conventional warehousing system featuring the automatic storage and retrieval of articles, indicated at 1, which articles are carried by pallets 3. The multi-tiered storage system illustrated is formed by a number of vertical beams 5 which combine with pairs of horizontal rails 7 (which rails function as tracks) to form lanes 9, three levels of such lanes 9 being illustrated in FIG. 1. A number of vertical beams 11, generally comparable to those indicated at 5, are provided, as are a number of pairs of horizontal rail or track members 13, the horizontal rails 13 being generally comparable to those illustrated at 7. The beams 11 and the tracks 13 combine to form the aisles 15 of the warehousing system, and, although only one aisle is illustrated in FIG. 1, it will be understood that a number of aisles 15 are associated with each level of lanes 9.

As is well known in the art (a typical system being illustrated in U.S. Pat. No. 3,973,685), such systems conventionally include mother vehicles (cranes, transfer cars or transfer vehicles) arranged to move along the track 7 of the lane 9, such a mother vehicle or transfer vehicle being indicated at 17. The transfer vehicle 17 is arranged to carry a satellite or robot vehicle, indicated at 19, to a selected aisle 15 whereupon the robot leaves the mother vehicle and travels to a desired position in such aisle where it deposits or retrieves a loaded pallet 3.

A walk path indicated at 21 is provided in each of the lanes 9 so that repair and maintenance personnel may have easy access to the storage structure when it is necessary to: manually realign a pallet load 1 within an aisle 15; remove debris in one of the lanes 9; or to service a vehicle 17 or a robot 19. As will readily be understood, the economical and efficient use of space requires that there be minimum clearance between the bottom of a transfer vehicle 17 and the upper surface of a walk path 21 and between the upper portion of a transfer vehicle 17 and the underside of the next higher walk path 21. Similarly, the space between the sides of the transfer vehicle 17 which are transverse to a lane 9 and the rails 5 and 13 must be minimized so that it is easier for a robot 19 departing from a transfer vehicle 17 to be properly aligned with the rails 13 of an aisle 15. The minimal clearances between the transfer vehicle 17 and the walk path 21 and between the vehicle 17 and the rails 5 render it impossible for a person on the walk path 21 to avoid being struck by a vehicle 17 if such vehicle is adjacent a person on the walk path. It is for this reason that it is necessary that an effective mechanism, capable of stopping the vehicle 17 as quickly as possible by, for example, cutting off power thereto, is required.

Figure 3:
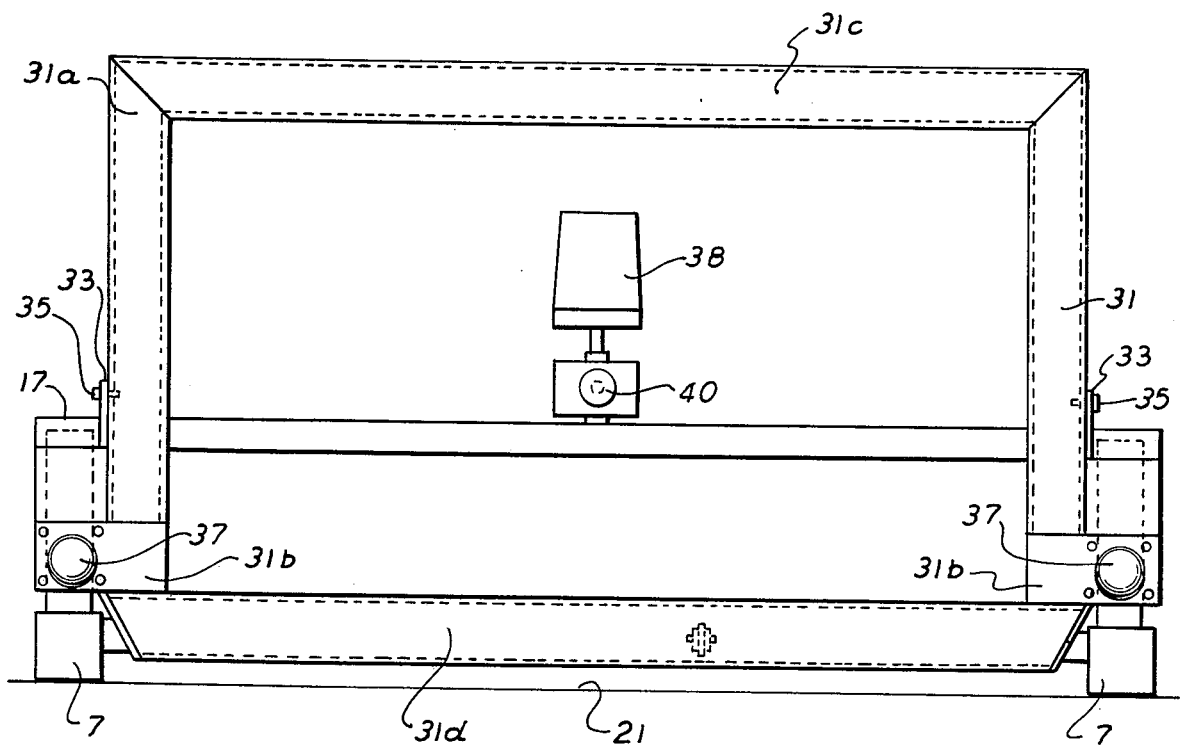
FIG. 3 is a detailed elevation view of one embodiment of the frame portion of the automatic drive prevention mechanism mounted on a transfer vehicle.
Figure 4:
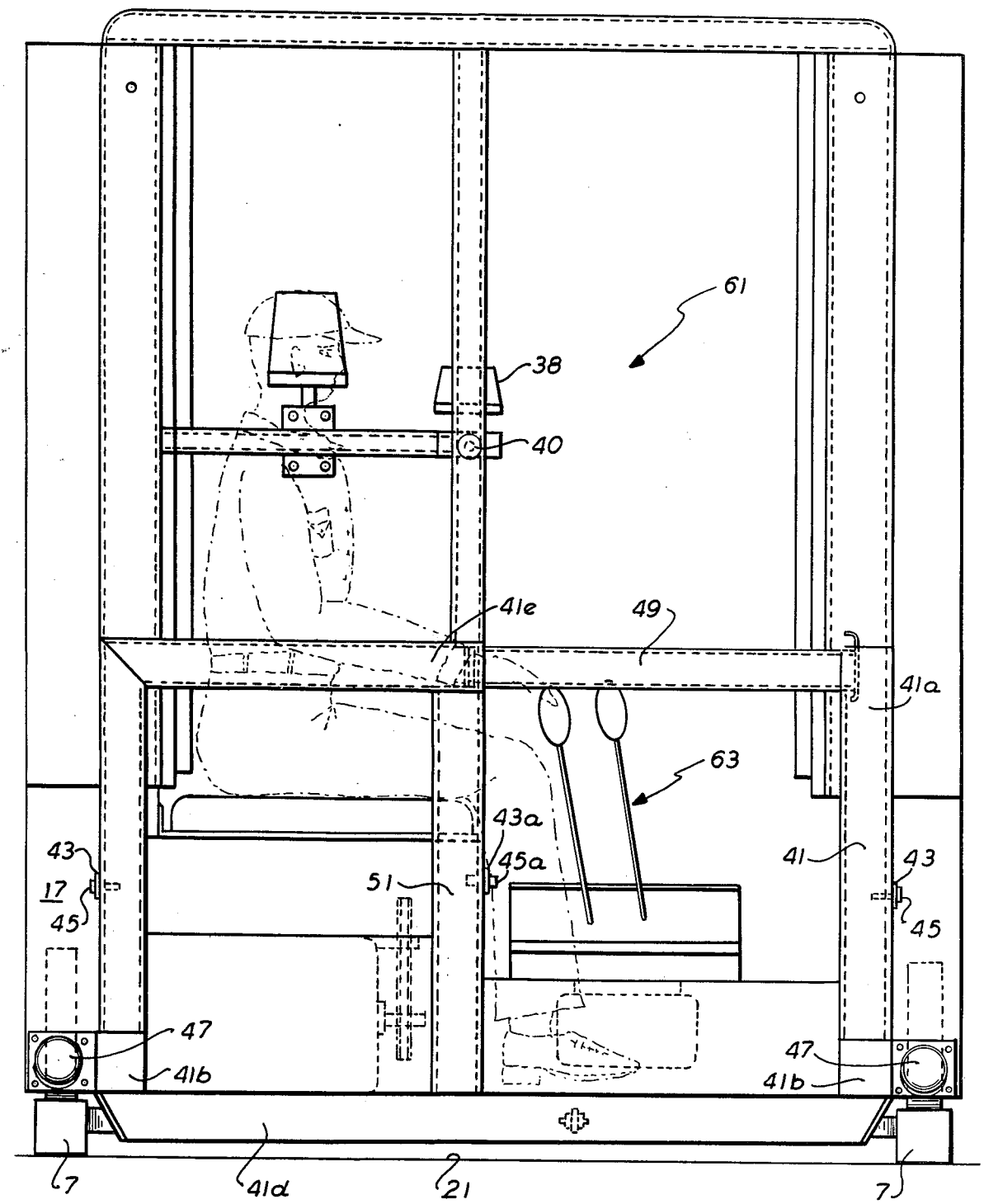
FIG. 4 is a detailed elevation view of a second embodiment of the frame portion of the inventive automatic drive prevention mechanism mounted on a transfer vehicle.

Turning now to FIGS. 2, 3 and 4, there is illustrated a transfer vehicle 17 provided with such a cut-off mechanism. The vehicle 17 which may be provided with motive power in any conventional manner, for example, by means of an electric drive motor (not illustrated). A forward switch frame 31 is pivotally mounted on the vehicle 17 by means of a pair of brackets 33 and a pair of pins 35 in any conventional manner by, for example, welding the brackets 33 to an appropriate portion of the frame of the vehicle 17. The switch frame 31, which may be made of any suitable material such as, for example, metal or plastic, is pivoted generally at the vertical mid-point thereof. The major portion of the switch frame 31, from the upper portion thereof indicated at 31a and approximately three-quarters of the way toward the lower portion thereof, indicated at 31b, is arranged to be vertical. The minor lower portion of the frame 31 is, however, canted outwardly, that is, away from the frame of the vehicle 17, for reasons of which will be explained below. A pair of bumpers 37, which may be made of a somewhat resilient material such as, for example, a hard rubber, extend outwardly from the lower canted portion 31b of the switch frame 31.

In operation (a more detailed view of the configuration of the forward switch frame 31 may be had by referring to FIG. 3), the frame 31 is pivotted about its axis of rotation, the pin 35 (to cause the desired switching action), by movement of the frame upper portion 31a either toward or away from the vehicle 17, (the switching mechanism will be explained in greater detail below in conjunction with a discussion of FIGS. 5 and 6). Clearly, since movement of the frame upper portion 31a toward the vehicle 17 causes the frame lower portion 31b to move away from the vehicle 17 and, conversely, movement of the upper portion 31a away from the vehicle 17 causes the lower portion 31b to move toward the vehicle 17, movement of the frame lower portion 31b either toward or away from the vehicle 17 will also cause the desired switching action (resulting in a cut-off motive power to the vehicle 17). It will now be understood that the reason the lower frame portion 31b is canted away from the vehicle 17 is due to the proximity of the frame 31 to the vehicle 17 and the fact that the lower portion 31b must be free to be moved toward the vehicle 17. Additionally, canting the lower portion permits any force applied thereto to be distributed over a large portion of the forward body of the vehicle 17, because the lower canted portion will be moved into a position in which it is flush against the forward portion of vehicle 17. Examination of FIG. 2 will now also make it clear that, in the event the vehicle moves toward and strikes an obstruction in a lane, the striking of the obstruction by the bumper 37 or the lower portion of the frame will immediately cause a cut-off of motive power to the vehicle 17.

FIG. 2 also illustrates what is conventionally referred to as the aft or rear end of the vehicle 17. This aft or rear portion of the vehicle 17 also has mounted thereon a switch frame which is indicated at 41. Although in FIG. 2 the two switch frames 31 and 41 appear to be identical, they are structured somewhat differently and such differences will be more fully discussed below in conjunction with a discussion of FIGS. 3 and 4. The frame 41 is pivotally mounted (at approximately the vertical mid-point of the frame 41) by means of brackets 43 and pivot pins 45. The frame 41 also has mounted thereon a pair of bumpers 47, the bumpers 47 being mounted at the lower portion 41b of the frame 41, which portion 41b is canted outwardly from the transfer vehicle 17.

Turning now to FIGS. 3 and 4, it will be seen that FIG. 3 illustrates the switch frame 31 which has a generally rectangular configuration. The width of the frame 31 is generally equal to the width of the transfer vehicle 17 on which it is mounted and the bumpers 37 are mounted on a portion of the frame 31 which extends somewhat outwardly of the remainder of the frame. Although no height dimensions for the switch frame 31 will be here provided it has been generally found that the height of the upper horizontal portion 31c of the frame 31 is suitably approximately waist high while the lower horizontal portion of the frame, indicated at 31d, should be near enough to the surface of the walk path 21 so that it will detect and respond to any obstruction on the path which will interfere with the operation of the vehicle 17.

At this point it is appropriate to note that transfer vehicles such as the one here under discussion conventionally carry warning lights and one such warning light, here indicated at 38, is mounted at the forward end of the vehicle 17. In addition, an emergency stop button of the type discussed above in Background of the Invention is illustrated at 40. A comparable warning light and stop button are also located at the aft end of the vehicle 17 and these two are also indicated at 38 and 40, respectively.

Turning now to FIG. 4, there is illustrated the switch frame 41 which is located at the aft end of the vehicle 17. This switch frame is generally comparable to the switch frame 31 illustrated in FIG. 3, the frame 41 also being made of any suitable material such as metal or a plastic. The periphery of the frame 41 is generally rectangular and the lower horizontal portion thereof, indicated at 41d, is positioned so as to just clear the surface of the walk path 21. The upper horizontal portion of the frame 41, which is indicated at one side as 41e and at the other side thereof as 49, is arranged so that its height above the walk path is generally waist high. The width of the frame 41 is, as is true also of the frame 31, generally equal in width to the width of the transfer vehicle 17 and the bumpers 47 of the frame 41 extend somewhat outwardly of the vertical sides of the frame 41.

Although transfer vehicles such as 17 are generally automatically operated, that is, under the control of a computer, provision may also be made for manual operation and such provision is made with respect to the instant vehicle 17. Thus, the vehicle 17 includes a cab portion indicated generally at 61 in which an operator may sit and manual controls, here schematically illustrated as joysticks 63, are provided. Because the vehicle 17 may be under manual control, provision must be made for ingress and egress of an operator from the cab. For this reason, the upper horizontal portion of the switch frame 41 includes two sections, 41e and 49, rather than the one section indicated as 31c with regard to the switch frame 31. The portion 41e of the frame 41 is constructed integrally with the remainder of the frame 41. The section 49, however, is arranged to telescope into the portion 41e when the former is in the open position and to extend out of the portion 41e, locking into an aperture formed in the upper portion 41a of the frame 41 in the closed position, which is the position illustrated in FIG. 4.

As previously discussed, movement of the upper horizontal portion of switch frame 41, either toward or away from the transfer vehicle 17 will immediately cause an interruption of motive power to the transfer vehicle. It may thus be seen that, in the event an operator in the vehicle 17 causes the initiation of forward movement of the vehicle 17 with sufficient acceleration to throw the operator backward, the operator will not be thrown from the vehicle with the possibility of injury, but rather, will cause the frame 41 to pivot about the pivot pins 45, thereby interrupting the provision of motive power to the vehicle 17. Although not here illustrated, it will also be understood that the sliding portion 49 of the frame 41 may be interlocked with the drive mechanism of vehicle 17 so that the portion 49 must be in its closed position before motive power may be provided to the vehicle. Alternatively, the interlock provided may be such that it is necessary for the sliding portion to be in its closed position for motive power to be provided to the vehicle 17 by means of the manual controls, i.e., the joysticks 63. Because the upper horizontal portion of the switch frame 41 is provided in two segments, 41e and 49, it has been found beneficial to provide an intermediate vertical support, indicated at 51, which has no counterpart in the switch frame 31. The vertical support 51 extends between the upper and lower horizontal portions 41d and 41e of the frame 41 and a pivot support bracket 43a and a pivot pin 45a, comparable to those provided at 43 and 45, respectively, are coupled between the frame of the vehicle 17 and the switch frame 41.

Figure 5:
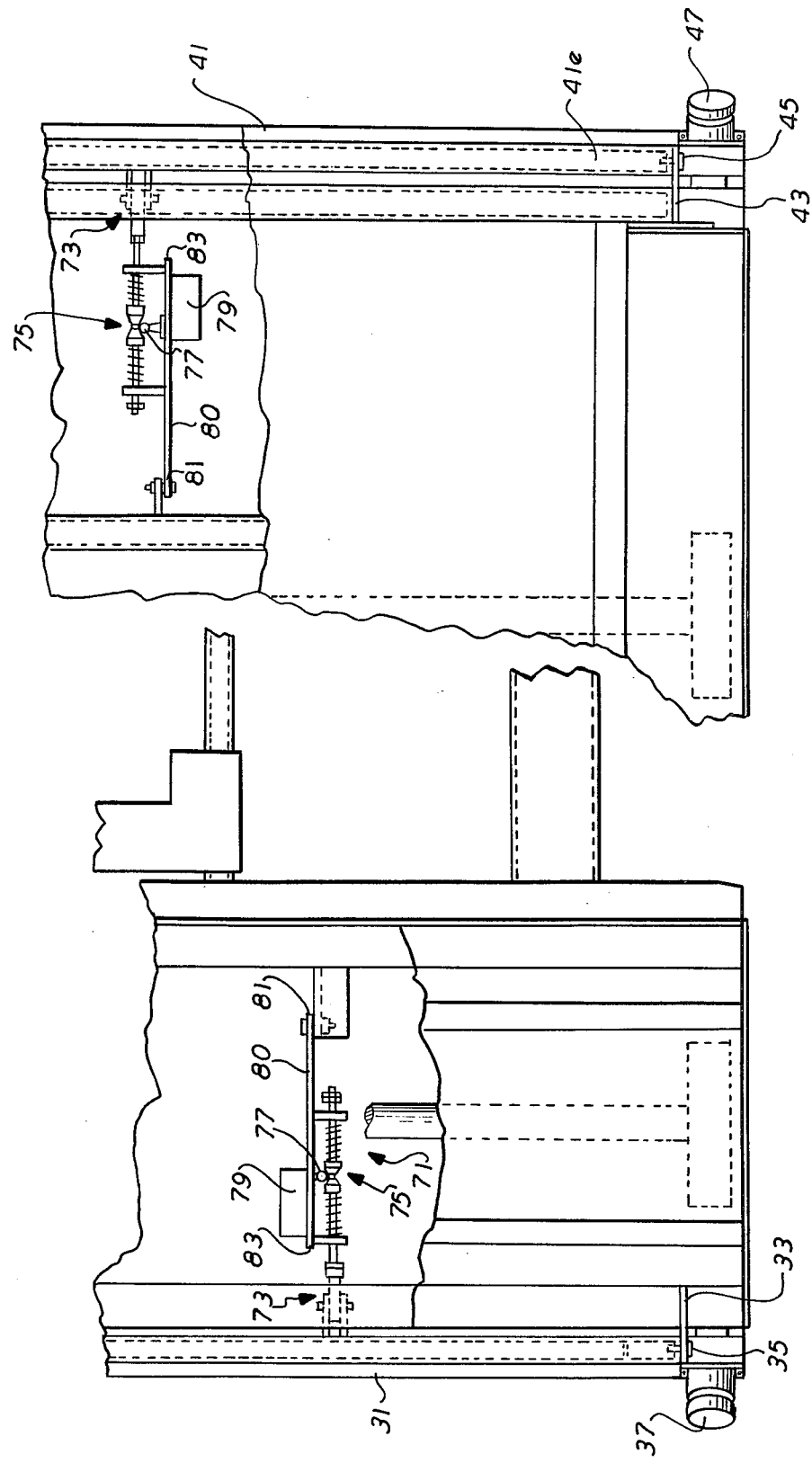
FIG. 5 is detailed plan view of the self-balancing portion of the inventive automatic drive prevention mechanism mounted on a transfer vehicle.

Turning now to FIG. 5, the underside of the transfer vehicle 17 and the switch frames 31 and 41 are illustrated. FIG. 5 also illustrates the relationship between the switching frames 31 and 41 and a self-centering or self-balancing switch controller indicated generally at 71. The switching controller 71 (which is most clearly illustrated in FIG. 6) includes a pivotable coupling indicating at 73 affixed, by any conventional means, to the switching frame 31. Attached to the coupling 73 is a self-balancing or self-centering cam mechanism indicated generally at 75, in which a switch actuator, in the form of a roller indicated at 77, rides. The switch itself, indicated at 79, is mounted in any conventional manner, for example, by screws and lock washers, to a pivot arm 80, which arm 80 is pivotably coupled at one end indicated at 81 to the frame of the vehicle 17 and at its other end, indicated at 83, to the remainder of the self-centering switch controller 71 in the vicinity of the coupling 73 (a detailed description of the structure and operation of the switch controller 71 will be provided in conjunction with a description of FIG. 6 below). FIG. 5 thus illustrates the relationship between the pivoting of switch frame 31 and the actuation of the switch 79, which switch is coupled in any conventional manner (as schematically illustrated in FIG. 6) to the drive mechanism of the vehicle 17. Although only the structure and operation of the forward switch controller 71 has here been discussed, it will be clear from the drawings that an identical switch controller, actuated in an identical manner, is provided in conjunction with switch frame 41 and the operation of the aft system will therefore not be further discussed.

Turning now to FIG. 6, the switch controller 71 and its self-centering or automatic return operation will be discussed in greater detail. The controller 71 includes a push rod 91 which is coupled to the pivotable coupling 73 by means of the nut 95. At the opposite end of the rod 91 is a nut 93 and maintained between the nuts 93 and 95 is a switch tripper 97 having a generally figure-eight configuration, the narrow waist of which, indicated at 99, serves as a cam race. At each side of the switch tripper 97 is positioned a compression spring, indicated at 101 and 103, respectively, one end of which presses against a level face of the switch tripper 97. Slidably mounted on the rod 91 are flanged bearings 109 and 111. The bearing 109 has a flange 105 and a flat washer 105a at opposite ends thereof and the bearing 111 has a flange 107 and a flat washer 107a at opposite ends thereof. The ends of the springs 101 and 103 opposite the ends in contact with the tripper 97 are arranged to bear against the flanges 105 and 107, respectively. The washer 107a of the bearing 111 is in contact with the nut 93 and the washer 105a of the bearing 109 is in contact with the flange end 114 of a tubular spacer 115, the opposite end of spacer 115 being in an abutting relationship with the nut 95.

As previously indicated, the end 81 of the pivot arm 80 is pivotally coupled to the frame of the transfer vehicle 17. Extending from the pivot arm 80 are a pair of apertured extensions, or arms, indicated at 112 and 113. The flanged bearings 109 and 111 pass through the apertures of the arms 113 and 112, respectively, permitting the sliding movement of the bearings relative to the arms. The switch actuator 77 functions as a cam and is located so that it is in its extended position when it is aligned with the waist 99 of the tripper 97. An aperture indicated at 115 is formed in a portion of the tripper 97 for a reason which will be explained below in conjunction with a discussion of the operation of the switch controller.

The operation of the switch controller will now be described with particular reference to FIGS. 5 and 6. As may be seen, when the switch frame 31 pivots away from its "null" or "neutral" position, the push rod 91 will be pulled toward or pushed away from the body of the vehicle 17 due to the coupling of the push rod 91 to the switch frame 31 by means of the pivotable coupling 73. The pivot arm 80, on which the switch 79 is mounted, will pivot about the end 81 which is coupled to the frame of the transfer vehicle 17 but will not move linearly, that is, toward or away from the switch frame 31. The switch actuator 77 will therefore be urged out of its position at the waist 99 of the tripper 97 and will ride up onto one or the other of the wider portions of the tripper 97. Because the pivot arm 80 and the push rod 91 are maintained parallel and fixedly spaced from one another by the extensions or arms 112 and 113, the switch 79 riding up on the actuator will cause the depression of the switch actuator 77 resulting in the interruption of motive power to the vehicle 17. As previously indicated, the switch controller 71 is self-centering, or, more accurately, self-nulling. Thus, it will return to an originally set position. For this reason, it is advisable, when the switch structure is originally assembled to so align the tripper 97 and the switch actuator 77 that the actuator 77 is located in the waist portion 99 of the tripper 97 when the switch frame 31 is in its neutral or non-pivoted configuration. Preferably, this is accomplished while the two springs 101 and 103 (which are desirably selected to be identical) are in a selected partially compressed configuration and the flanges 105 and 107 abut the adjacent faces of arms 113 and 112, respectively. At this time the tripper 97 may be fixedly coupled to the push rod 91. This fixed coupling may be accomplished by any conventional means. For example, a set screw may be utilized (in which case the aperture 116 would have to be threaded), or the aperture 116 might be drilled completely through the tripper 97 and into or through the rod 91 and a pin could be inserted.

It will now be seen that when the push rod 91 is urged in the direction indicated by the arrow 121 by the pivoting of the switch frame 31, the spring 103 will be further compressed while the spring 101 will remain in its initial configuration. This is because in this circumstance the bearing 109 will move in the direction of the arrow 121 and the distance between the flange 105 and the tripper 97 will remain constant. Upon release of the switch frame 31 the compressed spring 103 will urge the tripper 97 to return to its original position and the spring 101 will permit such return because it has not been further compressed. In the same manner, a pivoting of the switch frame 31 in the opposite direction will cause the push rod 91 to move in the direction indicated by the arrow 123. This will result in the compression of the spring 101 between the tripper 97 and the flange 105 (the switch roller 77 simultaneously being actuated) while the spring 103 will undergo no deformation since the distance between the flange 107 and the tripper 97 will remain constant. The release of the switch frame will cause the push rod 91 and the tripper 97 to return to their original position (with the switch roller 77 located at the waist 99 of tripper 97) due to the influence of the spring 101, it being understood, of course, that the spring 103 will not affect this action because it has not undergone any additional deformation.

Although, as indicated above, the return of the switch frame 31 to its neutral position causes release of the switch roller 77 when it returns to the waist 99 of the tripper 97, for safety reasons this action does not, in and of itself, cause motive power to be re-applied to the vehicle 17. Thus, once motive power to the vehicle 17 is interrupted due to the activation of the actuator 77, release of the actuator, although permitting power to be provided to the vehicle 17 does not cause the application of such power, and power to the vehicle must be manually authorized.

Although the foregoing has described the vehicle 17 as being powered by an electric motor, and FIG. 6 has schematically illustrated the switch 79 as being electrically coupled to the motor drive for the deactivation thereof, it will be understood that the principles of the present invention are applicable to alternative structures, such as, for example, coupling the switch 79 to a de-clutching mechanism whereby the motor drive continues to operate and power to the drive wheels is interrupted, or a structure whereby the switch 79 is coupled to a braking system which directly applies a braking force to the drive wheels.

It will be understood that the foregoing description of the preferred embodiments of the present invention is for purposes of illustration only, and that the various structural and operational features herein disclosed are susceptible to a number of modifications and changes none of which entail any departure from the spirit and scope of the present invention as defined in the hereto appended claims.

I claim:

1. An automatic drive prevention mechanism for an automated vehicle comprising:

a vehicle including motive means arranged for travel along a path;

a switch frame pivotally mounted on said vehicle, said frame lying generally in a plane orthogonal to said path when it is in its inactive position, the periphery of said frame having a generally rectangular configuration, one linearly extending side of said frame including two linearly extending sections coupled one to the other so as to be linearly moveable relative to one another; and switch means coupled to said frame and arranged to be activated to interrupt motive power to said vehicle when said frame is pivoted out of said orthogonal plane.

2. An automatic drive prevention mechanism according to claim 1 wherein said switch means is coupled between said frame and said motive means, the activation of said switch means deactivating said motive means.

3. An automatic drive prevention mechanism according to claim 1 wherein one of said sections is fixedly connected to the linearly extending side of said frame next adjacent thereto and the other of said sections is moveable into and out of a locking relationship with the linearly extending side of said frame next adjacent thereto.

4. An automatic drive prevention mechanism for an automated vehicle comprising:

a vehicle including motive means arranged for travel along a path;

a switch frame pivotally mounted on said vehicle, the frame lying generally in a plane orthogonal to said path when it is in its inactive position; and switch means coupled to said frame and arranged to be activated to interrupt motive power to said vehicle when said frame is pivoted out of said orthogonal plane, wherein said switch means comprises a self-nulling switch controller coupled to said switch frame and a switch, including a switch actuator, coupled to said switch controller and to said motive means; and wherein said switch controller comprises:

a push rod pivotally connected to said switch frame;

a pivot arm pivotally connected to the body of said vehicle and slideably coupled to said push rod; and a switch tripper fixedly coupled to said push rod, said tripper being positioned so as to be aligned with the actuator of said switch for control thereof.

5. An automatic drive prevention mechanism according to claim 4 wherein said switch controller further comprises first and second biasing means slidably coupled to said push rod, one of said biasing means being positioned at either end of said switch tripper and each being adapted to urge said tripper in an opposite direction along said push rod.

6. An automatic drive prevention mechanism according to claim 4 wherein said frame has a generally rectangular configuration.

7. An automatic drive prevention mechanism according to claim 6 wherein the portion of said frame adjacent said path is canted away from said vehicle.

8. An automatic drive prevention mechanism according to claim 7 further comprising a bumper affixed to the canted portion of said frame, said bumper extending from said frame in a direction away from said vehicle.

* * * * *